(12) United States Patent
Ma et al.

(10) Patent No.: US 11,314,045 B2
(45) Date of Patent: Apr. 26, 2022

(54) CAMERA OPTICAL LENS

(71) Applicant: AAC Optics Solutions Pte. Ltd., Singapore (SG)

(72) Inventors: Jian Ma, Shenzhen (CN); Lei Zhang, Shenzhen (CN)

(73) Assignee: AAC Optics Solutions Pte. Ltd., Singapore (SG)

(*) Notice: Subject to any disclaimer, the term of this patent is extended or adjusted under 35 U.S.C. 154(b) by 402 days.

(21) Appl. No.: 16/679,256

(22) Filed: Nov. 10, 2019

(65) Prior Publication Data
US 2020/0409099 A1 Dec. 31, 2020

(30) Foreign Application Priority Data
Jun. 30, 2019 (CN) .......................... 201910582030.0

(51) Int. Cl.
*G02B 9/62* (2006.01)
*G02B 13/00* (2006.01)
*G02B 27/00* (2006.01)

(52) U.S. Cl.
CPC ........... *G02B 9/62* (2013.01); *G02B 13/0045* (2013.01); *G02B 27/005* (2013.01)

(58) Field of Classification Search
None
See application file for complete search history.

(56) References Cited

U.S. PATENT DOCUMENTS

| | | | | |
|---|---|---|---|---|
| 2013/0329306 A1* | 12/2013 | Tsai | ...................... | G02B 13/18 |
| | | | | 359/713 |
| 2014/0139933 A1* | 5/2014 | Chen | .................. | G02B 13/0045 |
| | | | | 359/714 |
| 2015/0009578 A1* | 1/2015 | Shinohara | ................ | G02B 9/64 |
| | | | | 359/708 |
| 2015/0253541 A1* | 9/2015 | Hsu | ........................ | H04N 5/225 |
| | | | | 348/335 |
| 2016/0103299 A1* | 4/2016 | Lin | .................... | G02B 13/0045 |
| | | | | 359/713 |

* cited by examiner

*Primary Examiner* — Darryl J Collins
(74) *Attorney, Agent, or Firm* — W&G Law Group (57) ABSTRACT

The present invention discloses a camera optical lens. The camera optical lens includes, in an order from an object side to an image side, a first lens, a second lens, a third lens, a fourth lens, a fifth lens, and a sixth lens. The second lens has a negative refractive power and the third lends has a positive refractive power. The camera optical lens further satisfies the following specific conditions: $2.00 \leq f1/f3 \leq 5.00$ and $-16.00 \leq R5/R6 \leq -10.00$. The optical lens can achieve an excellent imaging performance and satisfy the design demands of ultra-thin, wide-angle and large aperture.

20 Claims, 6 Drawing Sheets

CAMERA OPTICAL LENS

FIELD OF THE PRESENT DISCLOSURE

The present disclosure relates to the field of optical lens, and more particularly, to a camera optical lens suitable for handheld terminal devices such as smart phones, digital cameras, and imaging device, such as monitor, or PC lenses.

DESCRIPTION OF RELATED ART

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lenses with good imaging quality therefore have become a mainstream in the market. In order to obtain better imaging quality, the lens that is traditionally equipped in mobile phone cameras adopts a three-piece or four-piece lens structure. Also, with the development of technology and the increase of the diverse demands of users, and as the pixel area of photosensitive devices is becoming smaller and smaller and the requirement of the system on the imaging quality is improving constantly, the five-piece, six-piece and seven-piece lens structures gradually appear in lens designs. There is an urgent need for ultra-thin and wide-angle camera lenses with good optical characteristics and fully corrected chromatic aberration.

DETAILED DESCRIPTION OF THE EXEMPLARY EMBODIMENTS

In order to make the objects, technical solutions, and advantages of the present invention more apparent, the embodiments of the present invention will be described in detail below, combined with the drawings. However, it will be apparent to the one skilled in the art that, in the various embodiments of the present invention, a number of technical details are presented in order to provide the reader with a better understanding of the invention. However, the technical solutions claimed in the present invention can be implemented without these technical details and can be implemented based on various changes and modifications to the following embodiments.

Embodiment 1

Figure 1:
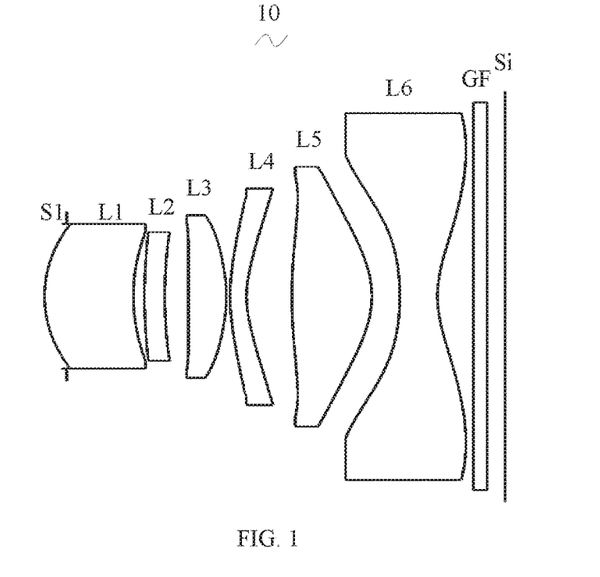
FIG. 1 is a schematic diagram of a structure of a camera optical lens in accordance with Embodiment 1 of the present invention.

As referring to the accompanying drawings, the present invention provides a camera optical lens 10. FIG. 1 shows the camera optical lens 10 according to embodiment 1 of the present invention, the camera optical lens comprises six lenses. Specifically, from an object side to an image side, the camera optical lens 10 comprises in sequence: an aperture S, a first lens L1, a second lens L2, a third lens L3, a fourth lens L4, a fifth lens L5, and a sixth lens L6. Optical elements like optical filter GF can be arranged between the sixth lens L6 and an image surface Si.

The first lens L1 is made of plastic material, the second lens L2 is made of plastic material, the third lens L3 is made of plastic material, the fourth lens L4 is made of plastic material, the fifth lens L5 is made of plastic material, and the sixth lens L6 is made of plastic material.

The second lens L2 has a negative refractive power, and the third lens L3 has a positive refractive power.

Here, a focal length of the first lens L1 is defined as f1, and a focal length of the third lens L3 is defined as f3. The camera optical lens 10 satisfies the following condition: $2.00 \leq f1/f3 \leq 5.00$, which specifies a ratio of the focal length f1 of the first lens L1 to the focal length f3 of the third lens L3, The focal length is reasonably distributed so that the camera optical lens has a good imaging quality and a lower sensitivity. Preferably, the following condition shall be satisfied, $2.00 \leq f1/f3 \leq 4.65$.

A curvature radius of an object side surface of the third lens L3 is defined as R5, a curvature radius of an image side surface of the third lens L3 is defined as R6. The camera optical lens 10 satisfies the following condition: $-16.00 \leq R5/R6 \leq -10.00$, which specifies a ratio of the curvature radius of the object side surface of the third lens to the image side surface of the third lens. When the value is within the range, as the camera optical lens develops toward ultra-thin and wide-angle, it is beneficial for correcting the problem of an off-axis abberation. Preferably, the following condition shall be satisfied, $-15.00 \leq R5/R6 \leq -10.00$.

A total optical length from an object side surface of the first lens to the image surface of the camera optical lens along an optical axis is defined as TTL. When the focal length of the camera optical lens 10 of the present invention, the focal length of the first lens, the focal length of the third lens, the curvature radius of the object side surface of the third lens, and the curvature radius of the image side surface of the third lens satisfy the above conditions, the camera optical lens 10 has the advantage of high performance and meets the design requirement on ultra-thin, wide-angle and large aperture.

In the embodiment, the object side surface of the first lens L1 is a convex surface in a paraxial region, an image side surface of the first lens L1 is a concave surface in the paraxial region, and the first lens L1 has a positive refractive power.

A focal length of the camera optical lens 10 is defined as f, and the focal length of the first lens L1 is defined as f1. The camera optical lens satisfies the following condition: $1.03 \leq f1/f \leq 5.59$, which defines a ratio of the focal length f1 of the first lens L1 to the focal length f of the camera optical lens 10. In this way, the first lens has the appropriate positive refractive power, thereby facilitating reducing an aberration of the system while facilitating a development towards ultra-thin and wide-angle lenses. Preferably, the following condition shall be satisfied, $1.64 \leq f1/f \leq 4.47$.

A curvature radius of the object side surface of the first lens L1 is R1, a curvature radius of the image side surface of the first lens L1 is R2, and the camera optical lens 10 satisfies: $-19.60 \leq (R1+R2)/(R1-R2) \leq -2.79$, and this condition reasonably controls a shape of the first lens, so that the first lens can effectively correct a spherical aberration of the system. Preferably, the following condition shall be satisfied, $-12.25 \leq (R1+R2)/(R1-R2) \leq -3.49$.

An on-axis thickness of the first lens L1 is d1, and the camera optical lens 10 satisfies the following condition: $0.06 \leq d1/TTL \leq 0.31$, which is beneficial for developing ultra-thin lenses. Preferably, the following condition shall be satisfied, $0.10 \leq d1/TTL \leq 0.25$.

In the embodiment, an object side surface of the second lens L2 is convex in the paraxial region, and an image side surface is concave in the paraxial region.

The focal length of the camera optical lens 10 is f, a focal length of the second lens L2 is f2, and the camera optical lens 10 satisfies the following condition: $-89.44 \leq f2/f \leq -26.34$, which is beneficial for correcting the aberration of the optical system by controlling the negative refractive power of the second lens L2 being within a reasonable range. Preferably, the following condition shall be satisfied, $-55.90 \leq f2/f \leq -32.93$.

A curvature radius of the object side surface of the second lens L2 is R3, and a curvature radius of the image side surface of the second lens L2 is R4, and the camera optical lens 10 satisfies the following condition: $11.95 \leq (R3+R4)/(R3-R4) \leq 36.11$, which specifies a shape of the second lens L2. When the value is within the range, as the camera optical lens develops toward ultra-thin and wide-angle, it is beneficial for correcting the problem of the abberation. Preferably, the following condition shall be satisfied, $19.12 \leq (R3+R4)/(R3-R4) \leq 28.89$.

An on-axis thickness of the second lens L2 is d3, and the camera optical lens 10 satisfies the following condition: $0.02 \leq d3/TTL \leq 0.07$, which is beneficial for developing ultra-thin lenses. Preferably, the following condition shall be satisfied, $0.03 \leq d3/TTL \leq 0.06$.

In the embodiment, an object side surface of the third lens L3 is convex in the paraxial region, and the image side surface of the third lens L3 is convex in the paraxial region.

The focal length of the camera optical lens 10 is f, a focal length of the third lens L3 is f3, and the camera optical lens 10 satisfies the following condition: $0.43 \leq f3/f \leq 1.54$. The refractive power is reasonably distributed so that the camera optical lens has the good imaging quality and lower sensitivity. Preferably, the following condition shall be satisfied, $0.69 \leq f3/f \leq 1.23$.

A curvature radius of the object side surface of the third lens L3 is R5, a curvature radius of the image side surface of the third lens L3 is R6, and the camera optical lens 10 satisfies the following condition: $0.414 \leq (R5+R6)/(R5-R6) \leq 1.30$, which can effectively control a shape of the third lens L3. It is beneficial for the shaping the third lens L3, and the bad shaping and stress generation due to extra large surface curvature of the third lens L3 can be avoided. Preferably, the following condition shall be satisfied, $0.65 \leq (R5+R6)/(R5-R6) \leq 1.04$.

An on-axis thickness of the third lens L3 is d5, and the camera optical lens 10 satisfies the following condition: $0.04 \leq d5/TTL \leq 0.16$, which is beneficial for developing ultra-thin lenses. Preferably, the following condition shall be satisfied, $0.07 \leq d5/TTL \leq 0.13$.

In the embodiment, an object side surface of the fourth lens L4 is convex in the paraxial region, an image side surface of the fourth lens L4 is concave in the paraxial region, and the fourth lens L4 has a negative refractive power.

The focal length of the camera optical lens 10 is f, a focal length of the fourth lens L4 is f4, and the camera optical lens 10 satisfies: $-2.93 \leq f4/f \leq -0.86$. The refractive power is reasonably distributed so that the system has the good imaging quality and lower sensitivity. Preferably, the following condition shall be satisfied, $-1.836 \ f4/f \leq -1.08$.

A curvature radius of the object side surface of the fourth lens L4 is R7, and a curvature radius of the image side surface of the fourth lens L4 is R8, and the camera optical lens 10 satisfies: $1.25 \ (R7+R8)/(R7-R8) \leq 4.15$, which specifies a shape of the fourth lens L4. When the value is within the range, as the camera optical lens develops toward ultra-thin and wide-angle, it is beneficial for correcting the problem of the off-axis abberation. Preferably, the following condition shall be satisfied, $2.00 \leq (R7+R8)/(R7-R8) \leq 3.32$.

An on-axis thickness of the fourth lens L4 is d7, and the camera optical lens 10 satisfies the following condition: $0.02 \leq d7/TTL \leq 0.08$, which is beneficial for developing ultra-thin lenses. Preferably, the following condition shall be satisfied, $0.03 \leq d7/TTL \leq 0.06$.

In the embodiment, an object side surface of the fifth lens L5 is convex in the paraxial region, an image side surface of the fifth lens L5 is convex in the paraxial region, and the fifth lens L5 has a positive refractive power.

The focal length of the camera optical lens 10 is f, a focal length of the fifth lens L5 is f5, and the camera optical lens 10 satisfies the following condition: $0.36 \leq f5/f \leq 1.36$, which can effectively make a light angle of the camera lens be gentle, and reduce a tolerance sensitivity. Preferably, the following condition shall be satisfied, $0.58 \leq f5/f \leq 1.08$.

A curvature radius of the object side surface of the fifth lens L5 is R9, and a curvature radius of the image side surface of the fifth lens L5 is R10, and the camera optical lens 10 satisfies the following condition: $0.22 \leq (R9+R10)/(R9-R10) \leq 1.07$, which specifies a shape of the fifth lens L5. When the value is within the range, as the camera optical lens develops toward ultra-thin and wide-angle, it is beneficial for correcting the problem of the off-axis abberation. Preferably, the following condition shall be satisfied, $0.35 \leq (R9+R10)/(R9-R10) \leq 0.86$.

An on-axis thickness of the fifth lens L5 is d9, the camera optical lens 10 satisfies the following condition: $0.09 \leq d9/TTL \leq 0.28$, which is beneficial for developing ultra-thin lenses. Preferably, the following condition shall be satisfied, $0.14 \leq d9/TTL \leq 0.22$.

In the embodiment, an object side surface of the sixth lens L6 is concave in the paraxial region, an image side surface of the sixth lens L6 is concave in the paraxial region, and the sixth lens L6 has a negative refractive power.

The focal length of the camera optical lens 10 is f, a focal length of the sixth lens L6 is f6, the camera optical lens 10 satisfies the following condition: $-1.66 \leq f6/f \leq -0.43$. The refractive power is reasonably distributed so that the system has the good imaging quality and lower sensitivity. Preferably, the following condition shall be satisfied, $-1.04 \leq f6/f \leq -0.54$.

A curvature radius of the object side surface of the sixth lens L6 is R11, a curvature radius of the image side surface of the sixth lens L6 is R12, and the camera optical lens 10 satisfies the following condition: $0.04 \leq (R11+R12)/(R11-R12) \leq 1.06$, which specifies a shape of the sixth lens L6. When the value is within the range, as the camera optical lens develops toward ultra-thin and wide-angle, it is beneficial for correcting the problem of the off-axis abberation. Preferably, the following condition shall be satisfied, $0.07 \leq (R11+R12)/(R11-R12) \leq 0.85$.

An on-axis thickness of the sixth lens L6 is d1, the camera optical lens 10 satisfies the following condition: $0.04 \leq d11/TTL \leq 0.15$, which is beneficial for developing ultra-thin lenses. Preferably, the following condition shall be satisfied, $0.07 \leq d11/TTL \leq 0.12$.

In this embodiment, the focal length of camera optical lens 10 is f, a combined focal length of the first lens L1 and the second lens L2 is f12, and the camera optical lens 10 satisfies following condition: $1.05 \leq f12/f \leq 6.03$. With such configuration, the aberration and distortion of the camera optical lens can be eliminated while suppressing a back focal length of the camera optical lens, thereby maintaining miniaturization of the camera lens system. Preferably, the following condition shall be satisfied, $1.69 \leq f12/f \leq 4.83$.

In this embodiment, the total optical length TTL of the camera optical lens 10 is less than or equal to 7.96 mm, and it is beneficial for developing ultra-thin lenses. Preferably, the total optical length TTL of the camera optical lens 10 is less than or equal to 7.59 mm.

In this embodiment, an F number of the camera optical lens 10 is less than or equal to 1.81. The camera optical lens 10 has a better imaging performance. Preferably, the F number of the camera optical lens 10 is less than or equal to 1.78.

In the following, examples will be used to describe the camera optical lens 10 of the present invention. The symbols recorded in each example will be described as follows. The focal length, on-axis distance, curvature radius, on-axis thickness, inflexion point position and arrest point position are all in unit of mm.

TTL: the total optical length from the object side surface of the first lens to the image surface of the camera optical lens along the optical axis, the unit of TTL is mm.

Preferably, inflexion points and/or arrest points can also be arranged on the object side surface and/or image side surface of the lens, so that the demand for high quality imaging can be satisfied, the description below can be referred for specific implementable scheme.

The design information of the camera optical lens 10 in the Embodiment 1 of the present invention is shown in the tables 1 and 2.

TABLE 1

| | R | d | | nd | | vd |
|---|---|---|---|---|---|---|
| S1 | ∞ | d0= | −0.343 | | | |
| R1 | 2.746 | d1= | 1.363 | nd1 | 1.5444 | v1 | 55.82 |
| R2 | 4.471 | d2= | 0.157 | | | |
| R3 | 11.101 | d3= | 0.312 | nd2 | 1.6700 | v2 | 19.39 |
| R4 | 10.216 | d4= | 0.135 | | | |
| R5 | 41.528 | d5= | 0.585 | nd3 | 1.5444 | v3 | 55.82 |
| R6 | −2.966 | d6= | 0.004 | | | |
| R7 | 5.117 | d7= | 0.258 | nd4 | 1.6449 | v4 | 22.54 |
| R8 | 2.402 | d8= | 0.475 | | | |

TABLE 1-continued

| | R | d | | nd | | vd |
|---|---|---|---|---|---|---|
| R9 | 12.986 | d9= | 1.226 | nd5 | 1.5444 | v5 | 55.82 |
| R10 | −2.248 | d10= | 0.429 | | | |
| R11 | −5.759 | d11= | 0.575 | nd6 | 1.5444 | v6 | 55.82 |
| R12 | 2.606 | d12= | 0.562 | | | |
| R13 | ∞ | d13= | 0.210 | ndg | 1.5168 | vg | 64.17 |
| R14 | ∞ | d14= | 0.266 | | | | where, meaning of the various symbols will be described as follows.

S1: aperture;

R: curvature radius of an optical surface, a central curvature radius for a lens;

R1: curvature radius of the object side surface of the first lens L1;

R2: curvature radius of the image side surface of the first lens L1;

R3: curvature radius of the object side surface of the second lens L2;

R4: curvature radius of the image side surface of the second lens L2;

R5: curvature radius of the object side surface of the third lens L3;

R6: curvature radius of the image side surface of the third lens L3;

R7: curvature radius of the object side surface of the fourth lens L4;

R8: curvature radius of the image side surface of the fourth lens L4;

R9: curvature radius of the object side surface of the fifth lens L5;

R10: curvature radius of the image side surface of the fifth lens L5;

R11: curvature radius of the object side surface of the sixth lens L6;

R12: curvature radius of the image side surface of the sixth lens L6;

R13: curvature radius of an object side surface of the optical filter GF;

R14: curvature radius of an image side surface of the optical filter GF;

d: on-axis thickness of a lens and an on-axis distance between lenses;

d0: on-axis distance from the aperture S1 to the object side surface of the first lens L1;

d1: on-axis thickness of the first lens L1;

d2: on-axis distance from the image side surface of the first lens L1 to the object side surface of the second lens L2;

d3: on-axis thickness of the second lens L2;

d4: on-axis distance from the image side surface of the second lens L2 to the object side surface of the third lens L3;

d5: on-axis thickness of the third lens L3;

d6: on-axis distance from the image side surface of the third lens L3 to the object side surface of the fourth lens L4;

d7: on-axis thickness of the fourth lens L4;

d8: on-axis distance from the image side surface of the fourth lens L4 to the object side surface of the fifth lens L5;

d9: on-axis thickness of the fifth lens L5;

d10: on-axis distance from the image side surface of the fifth lens L5 to the object side surface of the sixth lens L6;

d11: on-axis thickness of the sixth lens L6;

d12: on-axis distance from the image side surface of the sixth lens L6 to the object side surface of the optical filter GF;

d13: on-axis thickness of the optical filter GF;

d14: on-axis distance from the image side surface of the optical filter GF to the image surface;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
vg: abbe number of the optical filter GF.

Table 2 shows the aspherical surface data of the camera optical lens 10 in the embodiment 1 of the present invention.

Table 3 and Table 4 show design data of inflexion points and arrest points of respective lens in the camera optical lens 10 according to Embodiment 1 of the present invention. P1R1 and P1R2 represent the object side surface and the image side surface of the first lens L1, P2R1 and P2R2 represent the object side surface and the image side surface of the second lens L2, P3R1 and P3R2 represent the object side surface and the image side surface of the third lens L3, P4R1 and P4R2 represent the object side surface and the image side surface of the fourth lens L4, P5R1 and P5R2 represent the object side surface and the image side surface of the fifth lens L5, and P6R1 and P6R2 represent the object side surface and the image side surface of the sixth lens L6. The data in the column named "inflexion point position" refers to vertical distances from inflexion points arranged on each lens surface to the optical axis of the camera optical lens 10. The data in the column named "arrest point position" refers to vertical distances from arrest points arranged on each lens surface to the optical axis of the camera optical lens 10.

TABLE 2

| | Conic coefficient | Aspherical surface coefficients | | | | |
|---|---|---|---|---|---|---|
| | k | A4 | A6 | A8 | A10 | A12 |
| R1 | 6.5330E−03 | 4.8976E−16 | −5.7054E−15 | 2.5733E−14 | −5.8711E−14 | 7.5298E−14 |
| R2 | 1.1889E+00 | 1.6377E−15 | −2.0155E−14 | 9.5135E−14 | −2.3054E−13 | 3.2021E−13 |
| R3 | 2.3018E+01 | −1.4425E−02 | 9.5302E−03 | −1.1947E−02 | 1.2029E−02 | −7.5029E−03 |
| R4 | 3.8143E+01 | −1.5487E−02 | 1.6409E−02 | −3.3505E−02 | 5.1989E−02 | −4.8693E−02 |
| R5 | 2.0000E+02 | −8.2350E−03 | −4.2105E−03 | 1.2216E−02 | −1.9438E−02 | 1.6419E−02 |
| R6 | −4.2239E+01 | −3.1455E−02 | 1.7663E−02 | −3.8533E−03 | −1.0463E−02 | 1.1487E−02 |
| R7 | 6.4175E−01 | −2.3315E−02 | 8.9095E−03 | −3.5455E−03 | 1.0999E−03 | −2.6938E−04 |
| R8 | −1.6370E+01 | −4.1449E−17 | 5.6186E−17 | −1.2259E−17 | 1.9025E−17 | −3.5366E−17 |
| R9 | −2.0000E+02 | 1.1269E−02 | −8.6552E−03 | 4.0487E−03 | −1.3492E−03 | 2.8805E−04 |
| R10 | −2.5283E+00 | 1.6015E−02 | −4.7782E−03 | 1.6113E−03 | −4.1254E−04 | 6.7948E−05 |
| R11 | −4.7083E+00 | −2.1629E−02 | 3.7348E−03 | −3.8257E−04 | 5.7288E−05 | −7.5444E−06 |
| R12 | −7.3600E+00 | −1.3617E−02 | 2.5526E−03 | −3.9665E−04 | 4.4944E−05 | −3.5581E−06 |

| | Aspherical surface coefficients | | | |
|---|---|---|---|---|
| | A14 | A16 | A18 | A20 |
| R1 | −5.6589E−14 | 2.4715E−14 | −5.8074E−15 | 5.6766E−16 |
| R2 | −2.6507E−13 | 1.2920E−13 | −3.4209E−14 | 3.7942E−15 |
| R3 | 2.8884E−03 | −6.7393E−04 | 8.7848E−05 | −4.9424E−06 |
| R4 | 2.7174E−02 | −8.7975E−03 | 1.5057E−03 | −1.0462E−04 |
| R5 | −8.3780E−03 | 2.5741E−03 | −4.4216E−04 | 3.3114E−05 |
| R6 | −5.7989E−03 | 1.6149E−03 | −2.3871E−04 | 1.4767E−05 |
| R7 | 5.1998E−05 | −7.0075E−06 | 5.7461E−07 | −2.2335E−08 |
| R8 | 2.1201E−17 | −5.7731E−18 | 7.4679E−19 | −3.7371E−20 |
| R9 | −3.8832E−05 | 3.1551E−06 | −1.3931E−07 | 2.5515E−09 |
| R10 | −7.1507E−06 | 4.6565E−07 | −1.7043E−08 | 2.6705E−10 |
| R11 | 5.9216E−07 | −2.6267E−08 | 6.1704E−10 | −6.0024E−12 |
| R12 | 1.8594E−07 | −6.0120E−09 | 1.0854E−10 | −8.3711E−13 |

Where, K is a conic index, A4, A6, A8, A10, A12, A14, A16, A18, A20 are aspheric surface indexes.
IH: Image height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (1)$$

For convenience, an aspheric surface of each lens surface uses the is aspheric surfaces shown in the above formula (1). However, the present disclosure is not limited to the aspherical polynomials form shown in the formula (1).

TABLE 3

| | Number of inflexion points | Inflexion point position 1 |
|---|---|---|
| P1R1 | 0 | |
| P1R2 | 0 | |
| P2R1 | 0 | |
| P2R2 | 0 | |
| P3R1 | 1 | 0.485 |

TABLE 3-continued

| | Number of inflexion points | Inflexion point position 1 |
|---|---|---|
| P3R2 | 0 | |
| P4R1 | 0 | |
| P4R2 | 0 | |
| P5R1 | 1 | 1.265 |
| P5R2 | 0 | |
| P6R1 | 1 | 2.095 |
| P6R2 | 1 | 1.125 |

TABLE 4

| | Number of arrest points | Arrest point position 1 |
|---|---|---|
| P1R1 | 0 | |
| P1R2 | 0 | |
| P2R1 | 0 | |
| P2R2 | 0 | |
| P3R1 | 1 | 0.815 |
| P3R2 | 0 | |
| P4R1 | 0 | |
| P4R2 | 0 | |
| P5R1 | 1 | 1.935 |
| P5R2 | 0 | |
| P6R1 | 0 | |
| P6R2 | 1 | 2.885 |

Figure 2:
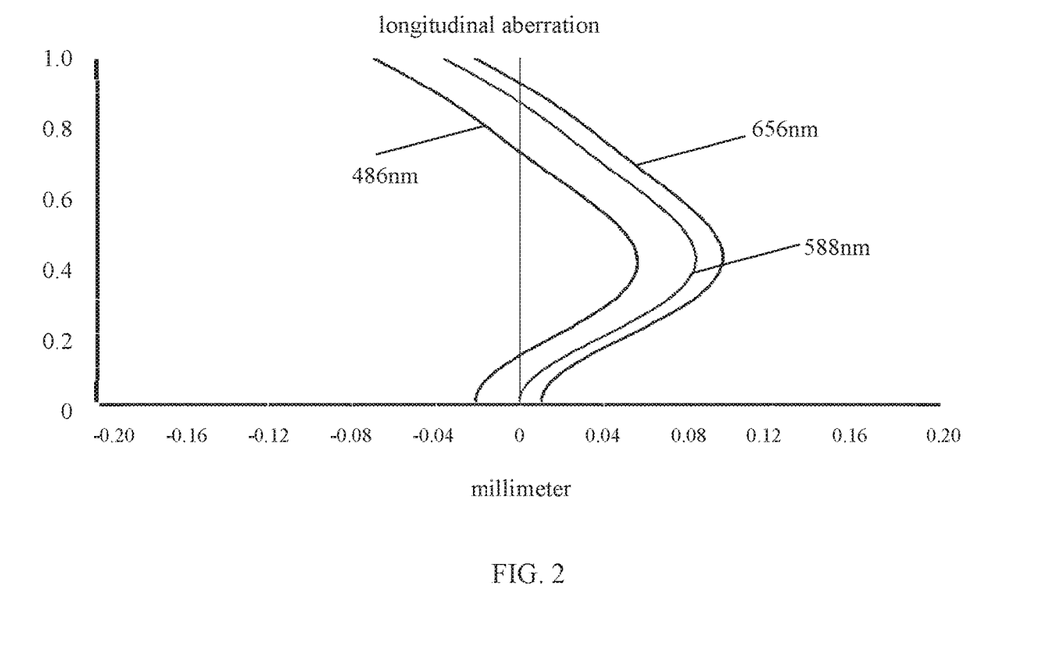
FIG. 2 is a schematic diagram of a longitudinal aberration of the camera optical lens shown in FIG. 1.
Figure 3:
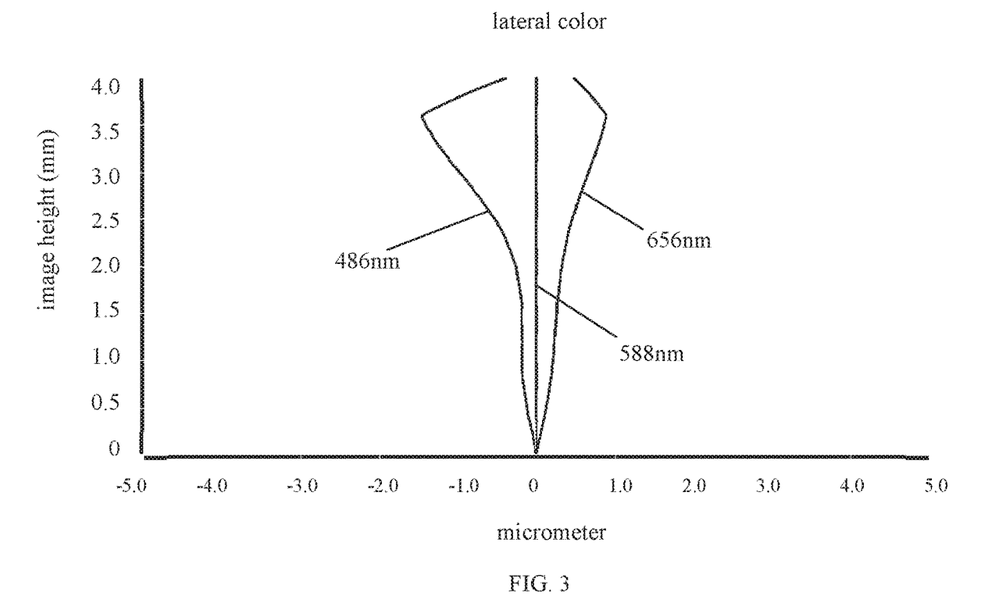
FIG. 3 is a schematic diagram of a lateral color of the camera optical lens shown in FIG. 1.
Figure 4:
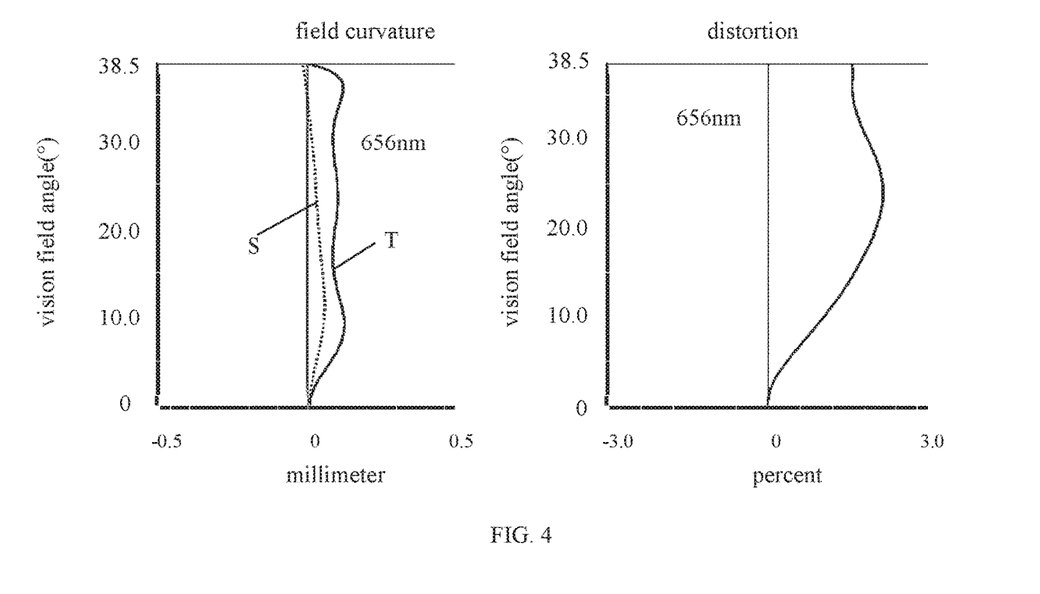
FIG. 4 is a schematic diagram of a field curvature and a distortion of the camera optical lens shown in FIG. 1.

FIG. 2 and FIG. 3 respectively illustrate a longitudinal aberration and a lateral color of light with wavelengths of 486 nm, 588 nm and 656 nm after passing the camera optical lens 10 according to Embodiment 1. FIG. 4 illustrates a field curvature and a distortion schematic diagrams of light with a wavelength of 656 nm after passing the camera optical lens 10 according to Embodiment 1, in which field curvature S is the field curvature in a sagittal direction and T is the field curvature in a tangential direction.

Table 13 described below shows the various values of the embodiments 1, 2, 3 and the values corresponding to the parameters which are specified in the conditions.

As shown in Table 13, Embodiment 1 satisfies the above conditions.

In this embodiment, an entrance pupil diameter of the camera optical lens is 2.830 mm. An image height of 1.0H is 4.000 mm. A FOV is 76.97°. Thus, the camera optical lens has a wide-angle and is ultra-thin. Its on-axis and off-axis chromatic aberrations are fully corrected, thereby achieving excellent optical characteristics.

Embodiment 2

Embodiment 2 is basically the same as Embodiment 1, the meaning of its symbols is the same as that of Embodiment 1, in the following, only the differences are listed.

Figure 5:
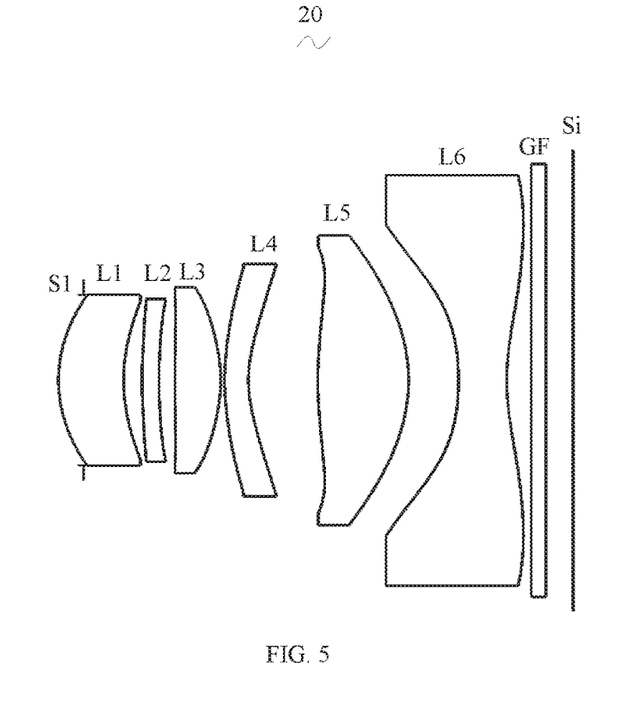
FIG. 5 is a schematic diagram of a structure of a camera optical lens in accordance with Embodiment 2 of the present invention.

Table 5 and table 6 show the design data of a camera optical lens in Embodiment 2 of the present invention.

TABLE 5

| | R | d | nd | | vd | |
|---|---|---|---|---|---|---|
| S1 | ∞ | d0= −0.362 | | | | |
| R1 | 2.815 | d1= 0.941 | nd1 | 1.5444 | v1 | 55.82 |
| R2 | 3.778 | d2= 0.262 | | | | |
| R3 | 11.049 | d3= 0.243 | nd2 | 1.6700 | v2 | 19.39 |
| R4 | 10.162 | d4= 0.167 | | | | |
| R5 | 34.379 | d5= 0.664 | nd3 | 1.5444 | v3 | 55.82 |
| R6 | −2.714 | d6= 0.050 | | | | |
| R7 | 5.621 | d7= 0.341 | nd4 | 1.6449 | v4 | 22.54 |
| R8 | 2.411 | d8= 0.687 | | | | |
| R9 | 8.746 | d9= 1.307 | nd5 | 1.5444 | v5 | 55.82 |
| R10 | −3.458 | d10= 0.721 | | | | |
| R11 | −5.285 | d11= 0.696 | nd6 | 1.5444 | v6 | 55.82 |
| R12 | 4.463 | d12= 0.362 | | | | |
| R13 | ∞ | d13= 0.210 | ndg | 1.5168 | vg | 64.17 |
| R14 | ∞ | d14= 0.386 | | | | |

Table 6 shows the aspherical surface data of each lens of the camera optical lens 20 in Embodiment 2 of the present invention.

TABLE 6

| | Conic coefficient | Aspherical surface coefficients | | | | |
|---|---|---|---|---|---|---|
| | k | A4 | A6 | A8 | A10 | A12 |
| R1 | −3.2806E−01 | −1.7837E−03 | 1.4827E−02 | −4.5816E−02 | 7.4635E−02 | −7.1391E−02 |
| R2 | −1.8008E+00 | −8.2853E−03 | 5.0125E−02 | −1.3770E−01 | 2.1559E−01 | −2.0146E−01 |
| R3 | 2.3441E+00 | −1.6710E−02 | 9.5904E−03 | 8.1984E−03 | −6.8782E−02 | 1.3494E−01 |
| R4 | 4.0571E+01 | −2.9331E−02 | 8.8319E−02 | −2.2955E−01 | 3.5421E−01 | −3.3343E−01 |
| R5 | 2.6765E+02 | −3.6365E−04 | −5.4101E−02 | 1.7890E−01 | −2.9860E−01 | 2.8879E−01 |
| R6 | −2.4192E+01 | −3.3298E−02 | 4.6543E−02 | −9.1506E−02 | 1.2105E−01 | −1.0104E−01 |
| R7 | 2.2234E+00 | −1.2293E−02 | −3.9757E−02 | 6.2711E−02 | −5.3331E−02 | 2.7880E−02 |
| R8 | −1.4075E+01 | −1.4514E−02 | 4.6137E−02 | −6.6966E−02 | 5.5055E−02 | −2.7518E−02 |
| R9 | −1.8739E+02 | 1.6149E−02 | −8.2500E−03 | −3.4240E−03 | 5.8364E−03 | −3.1188E−03 |
| R10 | −1.2184E+00 | 4.1319E−03 | −5.9036E−03 | 6.0096E−03 | −3.4390E−03 | 1.1617E−03 |
| R11 | 6.9456E−01 | −3.8639E−02 | 2.8897E−02 | −2.3493E−02 | 1.2302E−02 | −3.8922E−03 |
| R12 | −1.1417E+01 | −1.2749E−02 | 2.4727E−03 | −4.9635E−04 | 1.1350E−04 | −2.1880E−05 |

| | Aspherical surface coefficients | | | |
|---|---|---|---|---|
| | A14 | A16 | A18 | A20 |
| R1 | 4.1377E−02 | −1.4294E−02 | 2.7037E−03 | −2.1495E−04 |
| R2 | 1.1193E−01 | −3.5350E−02 | 5.5048E−03 | −2.6726E−04 |
| R3 | −1.3107E−01 | 6.9474E−02 | −1.9305E−02 | 2.2105E−03 |
| R4 | 1.9550E−01 | −6.9870E−02 | 1.3949E−02 | −1.1964E−03 |
| R5 | −1.7000E−01 | 6.0138E−02 | −1.1762E−02 | 9.7790E−04 |

TABLE 6-continued

| | | | | |
|---|---|---|---|---|
| R6 | 5.2148E−02 | −1.6190E−02 | 2.7724E−03 | −2.0106E−04 |
| R7 | −9.1881E−03 | 1.8619E−03 | −2.1189E−04 | 1.0364E−05 |
| R8 | 8.5263E−03 | −1.6006E−03 | 1.6682E−04 | −7.4108E−06 |
| R9 | 8.9288E−04 | −1.4695E−04 | 1.3131E−05 | −4.9444E−07 |
| R10 | −2.3353E−04 | 2.6870E−05 | −1.5789E−06 | 3.4317E−08 |
| R11 | 7.5672E−04 | −8.8609E−05 | 5.7371E−06 | −1.5788E−07 |
| R12 | 2.8023E−06 | −2.1613E−07 | 9.0506E−09 | −1.5774E−10 |

Table 7 and table 8 show design data of the inflexion points and the arrest points of the camera optical lens 20 lens in Embodiment 2 of the present invention.

TABLE 7

| | Number of inflexion points | Inflexion point position 1 | Inflexion point position 2 |
|---|---|---|---|
| P1R1 | 0 | | |
| P1R2 | 0 | | |
| P2R1 | 2 | 1.085 | 1.335 |
| P2R2 | 0 | | |
| P3R1 | 1 | 0.765 | |
| P3R2 | 0 | | |
| P4R1 | 0 | | |
| P4R2 | 1 | 1.825 | |
| P5R1 | 1 | 1.095 | |
| P5R2 | 0 | | |
| P6R1 | 2 | 2.115 | 2.635 |
| P6R2 | 1 | 1.095 | |

TABLE 8

| | Number of arrest points | Arrest point position 1 |
|---|---|---|
| P1R1 | 0 | |
| P1R2 | 0 | |
| P2R1 | 0 | |
| P2R2 | 0 | |
| P3R1 | 1 | 1.105 |
| P3R2 | 0 | |
| P4R1 | 0 | |
| P4R2 | 0 | |
| P5R1 | 1 | 1.775 |
| P5R2 | 0 | |
| P6R1 | 0 | |
| P6R2 | 1 | 2.715 |

Figure 6:
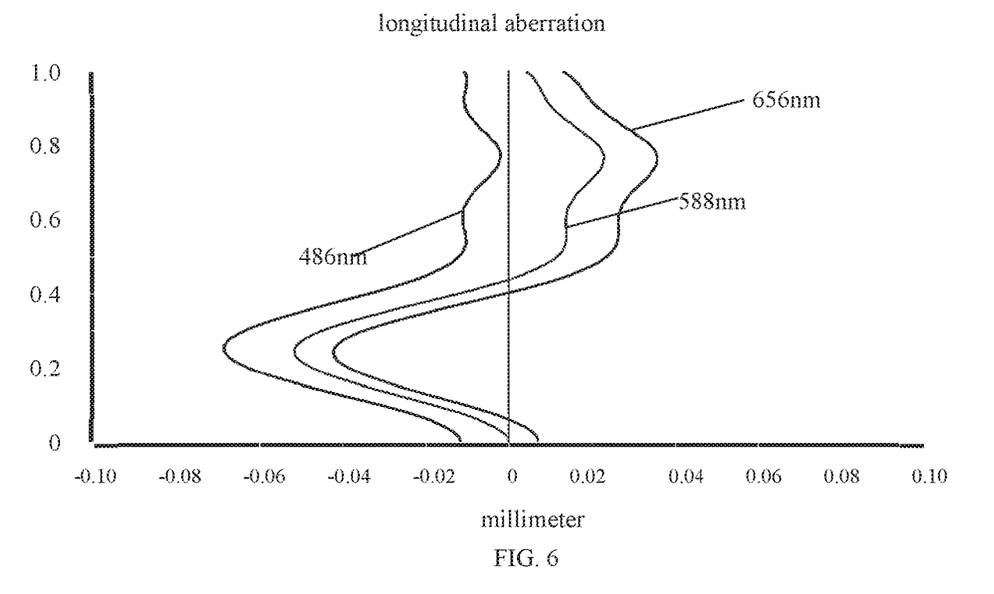
FIG. 6 is a schematic diagram of a longitudinal aberration of the camera optical lens shown in FIG. 5.
Figure 7:
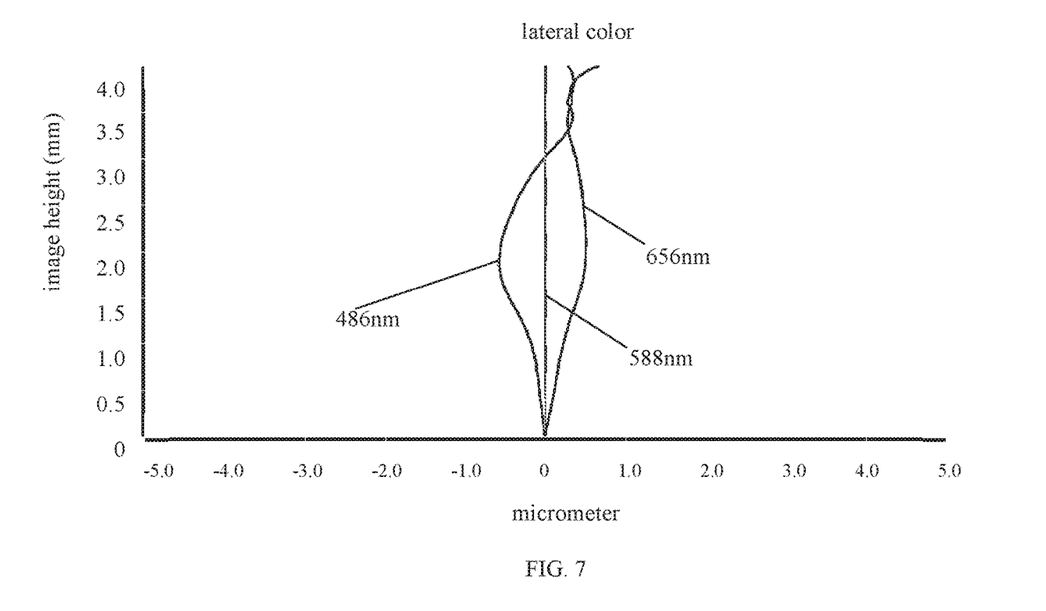
FIG. 7 is a schematic diagram of a lateral color of the camera optical lens shown in FIG. 5.
Figure 8:
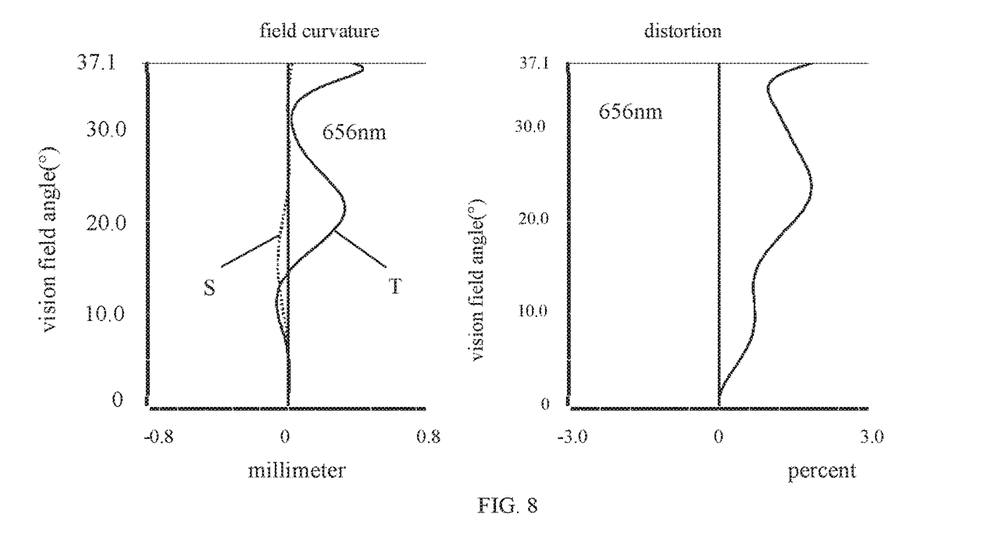
FIG. 8 is a schematic diagram of a field curvature and a distortion of the camera optical lens shown in FIG. 5.

FIG. 6 and FIG. 7 respectively illustrate a longitudinal aberration and a lateral color of light with wavelengths of 486 nm, 588 nm and 656 nm after passing the camera optical lens 20 according to Embodiment 2. FIG. 8 illustrates a field curvature and a distortion of light with a wavelength of 656 nm after passing the camera optical lens 10 according to Embodiment 2, in which a field curvature S is a field curvature in a sagittal direction and T is a field curvature in a tangential direction.

As shown in Table 13, Embodiment 2 satisfies the above conditions.

In this embodiment, the entrance pupil diameter of the camera optical lens is 2.978 mm. The image height of IH is 4.00 mm. The FOV is 74.17°. Thus, the camera optical lens has a wide-angle and is ultra-thin. Its on-axis and off-axis chromatic aberrations are fully corrected, thereby achieving excellent optical characteristics.

Embodiment 3

Embodiment 3 is basically the same as Embodiment 1, the meaning of its symbols is the same as that of Embodiment 1, in the following, only the differences are listed.

Figure 9:
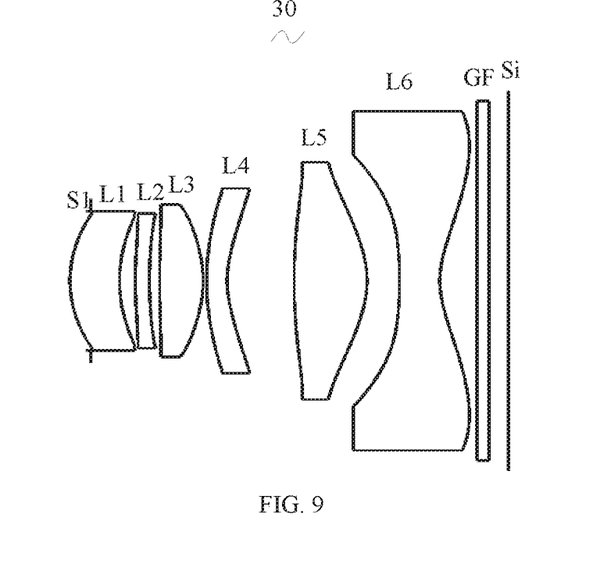
FIG. 9 is a schematic diagram of a structure of a camera optical lens in accordance with Embodiment 3 of the present invention.

The design information of a camera optical lens 30 in Embodiment 3 of the present invention is shown in the tables 9 and 10.

TABLE 9

| | R | d | | nd | | vd | |
|---|---|---|---|---|---|---|---|
| S1 | ∞ | d0= | −0.368 | | | | |
| R1 | 2.974 | d1= | 0.882 | nd1 | 1.5444 | v1 | 55.82 |
| R2 | 3.651 | d2= | 0.276 | | | | |
| R3 | 11.101 | d3= | 0.250 | nd2 | 1.6700 | v2 | 19.39 |
| R4 | 10.216 | d4= | 0.134 | | | | |
| R5 | 27.868 | d5= | 0.780 | nd3 | 1.5444 | v3 | 55.82 |
| R6 | −2.787 | d6= | 0.050 | | | | |
| R7 | 5.849 | d7= | 0.368 | nd4 | 1.6449 | v4 | 22.54 |
| R8 | 2.602 | d8= | 0.674 | | | | |
| R9 | 16.081 | d9= | 1.300 | nd5 | 1.5444 | v5 | 55.82 |
| R10 | −2.659 | d10= | 0.577 | | | | |
| R11 | −14.543 | d11= | 0.722 | nd6 | 1.5444 | v6 | 55.82 |
| R12 | 2.473 | d12= | 0.662 | | | | |
| R13 | ∞ | d13= | 0.210 | ndg | 1.5168 | vg | 64.17 |
| R14 | ∞ | d14= | 0.348 | | | | |

Table 10 shows the aspherical surface data of each lens of the camera optical lens 30 in Embodiment 3 of the present invention.

TABLE 10

| | Conic coefficient | Aspherical surface coefficients | | | | |
|---|---|---|---|---|---|---|
| | k | A4 | A6 | A8 | A10 | A12 |
| R1 | −3.5846E−01 | −1.0271E−15 | 1.0210E−14 | −4.0052E−14 | 8.1265E−14 | −9.4569E−14 |
| R2 | −1.4194E+00 | −3.4975E−16 | 3.7909E−15 | −1.5523E−14 | 3.1844E−14 | −3.6004E−14 |
| R3 | −2.7075E+01 | −1.4783E−02 | 1.0418E−02 | −1.4858E−02 | 1.5798E−02 | −1.0406E−02 |
| R4 | 3.7334E+01 | −1.5543E−02 | 1.6773E−02 | −3.5899E−02 | 5.6673E−02 | −5.4004E−02 |
| R5 | 2.0000E+02 | −2.7849E−03 | −1.823 1E−03 | 3.2310E−03 | −3.6869E−03 | 2.2334E−03 |
| R6 | −1.9293E+01 | −2.7176E−02 | 1.3248E−02 | −2.4842E−03 | −6.0447E−03 | 5.9464E−03 |
| R7 | 2.6284E+00 | −1.3731E−02 | 3.8842E−03 | −1.1047E−03 | 2.5604E−04 | −4.6850E−05 |
| R8 | −1.3291E+01 | −3.6107E−16 | 1.6536E−15 | −2.8168E−15 | 2.4351E−15 | −1.2024E−15 |
| R9 | −2.0000E+02 | 9.1508E−03 | −4.4847E−03 | 1.6620E−03 | −4.4333E−04 | 7.5764E−05 |
| R10 | −5.3427E+00 | 1.4942E−04 | 1.8183E−04 | 2.4451E−05 | −2.1972E−06 | 1.2702E−07 |
| R11 | 2.3036E+01 | −1.6402E−02 | 1.5376E−03 | −7.7315E−05 | 7.7624E−06 | −6.8540E−07 |
| R12 | −6.1771E+00 | −1.3021E−02 | 2.6022E−03 | −4.2466E−04 | 4.8946E−05 | −3.9416E−06 |

TABLE 10-continued

|  | Aspherical surface coefficients | | | |
|---|---|---|---|---|
|  | A14 | A16 | A18 | A20 |
| R1 | 6.5478E−14 | −2.6627E−14 | 5.8660E−15 | −5.3985E−16 |
| R2 | 2.2924E−14 | −7.8616E−15 | 1.2320E−15 | −4.6742E−17 |
| R3 | 4.2303E−03 | −1.0423E−03 | 1.4348E−04 | −8.5246E−06 |
| R4 | 3.0662E−02 | −1.0100E−02 | 1.7587E−03 | −1.2432E−04 |
| R5 | −8.1726E−04 | 1.8007E−04 | −2.2182E−05 | 1.1913E−06 |
| R6 | −2.6898E−03 | 6.7120E−04 | −8.8907E−05 | 4.9282E−06 |
| R7 | 6.7563E−06 | −6.8027E−07 | 4.1675E−08 | −1.2102E−09 |
| R8 | 3.5400E−16 | −6.1497E−17 | 5.8193E−18 | −2.3129E−19 |
| R9 | −8.1754E−06 | 5.3170E−07 | −1.8792E−08 | 2.7549E−10 |
| R10 | −4.6914E−09 | 1.0722E−10 | −1.3774E−12 | 7.5752E−15 |
| R11 | 3.6070E−08 | −1.0728E−09 | 1.6896E−11 | −1.1020E−13 |
| R12 | 2.0953E−07 | −6.8912E−09 | 1.2655E−10 | −9.9282E−13 |

Table 11 and table 12 show design data of the inflexion points and the arrest points of the camera optical lens 30 lens in Embodiment 3 of the present invention.

TABLE 11

|  | Number of inflexion points | Inflexion point position 1 |
|---|---|---|
| P1R1 | 0 |  |
| P1R2 | 0 |  |
| P2R1 | 1 | 0.835 |
| P2R2 | 0 |  |
| P3R1 | 1 | 1.005 |
| P3R2 | 0 |  |
| P4R1 | 0 |  |
| P4R2 | 0 |  |
| P5R1 | 1 | 1.735 |
| P5R2 | 1 | 1.735 |
| P6R1 | 0 |  |
| P6R2 | 1 | 1.225 |

TABLE 12

|  | Number of arrest points | Arrest point position 1 |
|---|---|---|
| P1R1 | 0 |  |
| P1R2 | 0 |  |
| P2R1 | 0 |  |
| P2R2 | 0 |  |
| P3R1 | 1 | 1.495 |
| P3R2 | 0 |  |
| P4R1 | 0 |  |
| P4R2 | 0 |  |
| P5R1 | 1 | 2.465 |
| P5R2 | 0 |  |
| P6R1 | 0 |  |
| P6R2 | 1 | 2.975 |

Figure 10:
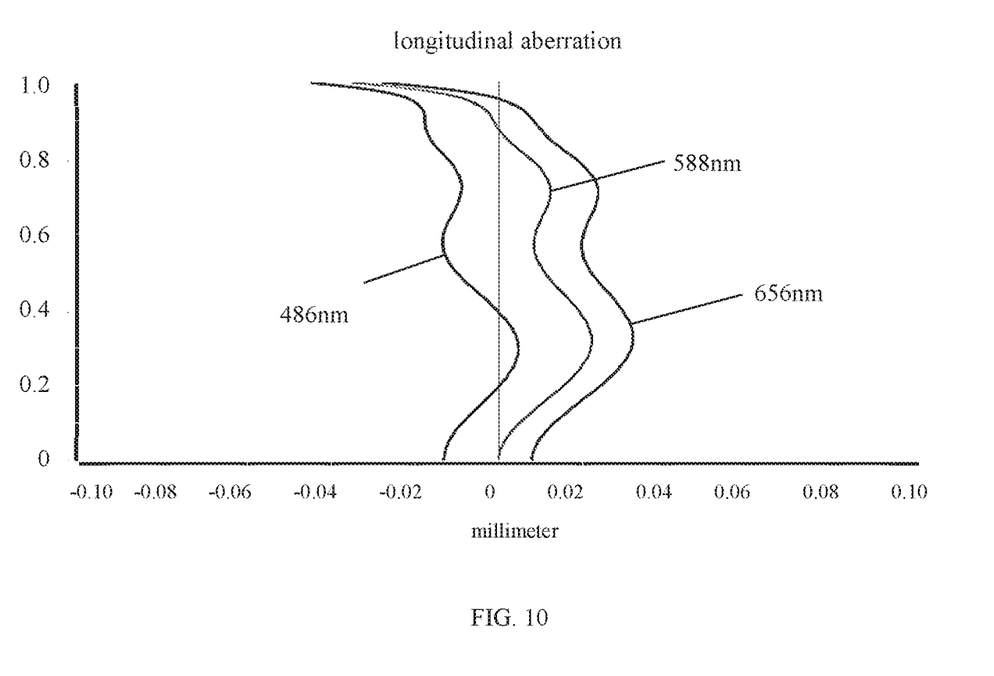
FIG. 10 is a schematic diagram of a longitudinal aberration of the camera optical lens shown in FIG. 9.
Figure 11:
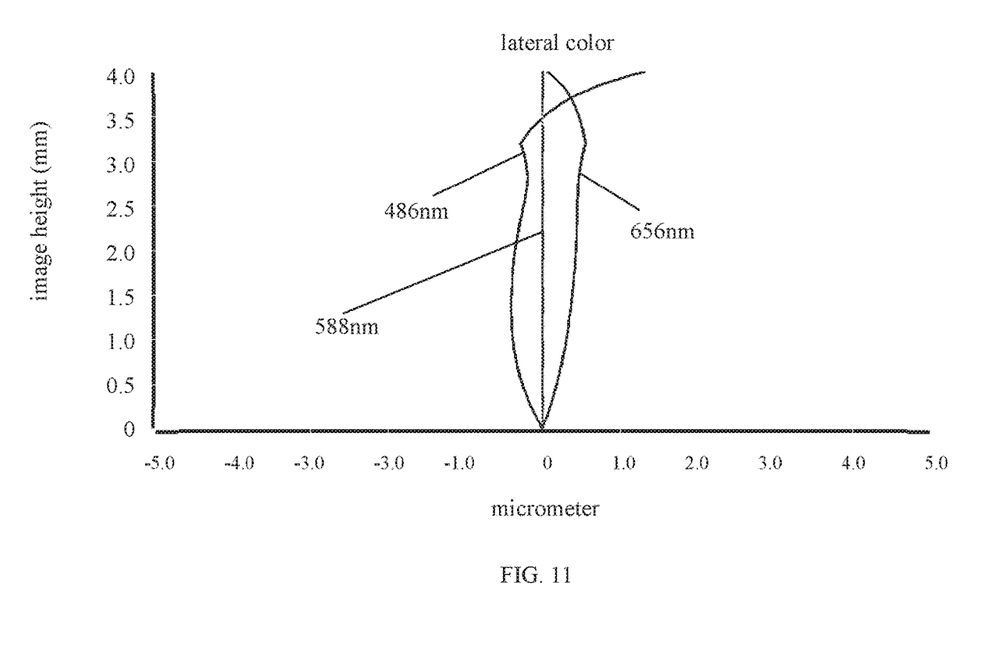
FIG. 11 is a schematic diagram of a lateral color of the camera optical lens shown in FIG. 9.
Figure 12:
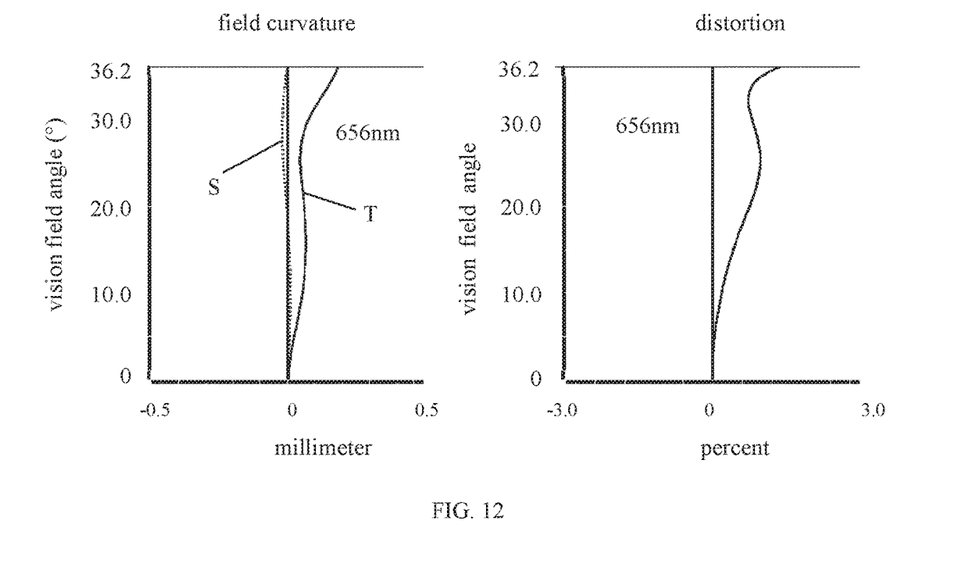
FIG. 12 is a schematic diagram of a field curvature and a distortion of the camera optical lens shown in FIG. 9.

FIG. 10 and FIG. 11 respectively illustrate a longitudinal aberration and a lateral color of light with wavelengths of 486 nm, 588 nm and 656 nm after passing the camera optical lens 30 according to Embodiment 3. FIG. 12 illustrates a field curvature and a distortion of light with a wavelength of 656 nm after passing the camera optical lens 30 according to Embodiment 3, in which a field curvature S is a field curvature in a sagittal direction and T is a field curvature in a tangential direction.

The following table 13, in accordance with the above conditions, lists the values in this embodiment corresponding to each condition expression. Apparently, the camera optical of this embodiment satisfies the above conditions.

In this embodiment, the entrance pupil diameter of the camera optical lens is 3.082 mm. The image height of 1.0H is 4.000 mm. The FOV is 72.38°. Thus, the camera optical lens has a wide-angle and is ultra-thin. Its on-axis and off-axis chromatic aberrations are fully corrected, thereby achieving excellent optical characteristics.

TABLE 13

| Parameters and conditions | Embodiment 1 | Embodiment 2 | Embodiment 3 |
|---|---|---|---|
| f | 4.977 | 5.212 | 5.394 |
| f1 | 10.224 | 15.013 | 20.106 |
| f2 | −222.564 | −209.760 | −213.144 |
| f3 | 5.109 | 4.6303 | 4.676 |
| f4 | −7.291 | −6.760 | −7.532 |
| f5 | 3.622 | 4.711 | 4.279 |
| f6 | −3.218 | −4.317 | −3.809 |
| f12 | 10.485 | 15.840 | 21.695 |
| FNO | 1.76 | 1.75 | 1.75 |
| f1/f3 | 2.00 | 3.24 | 4.30 |
| R5/R6 | −14.00 | −12.67 | −10.00 |

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera optical lens, comprising, from an object side to an image side in sequence: a first lens, a second lens, a third lens, a fourth lens, a fifth lens, and a sixth lens;
the second lens has a negative refractive power, and the third lens has a positive refractive power;
wherein the camera optical lens satisfies the following conditions:

$2.00 \leq f1/f3 \leq 5.00$; and $-16.00 \leq R5/R6 \leq -10.00$;

where
f1: a focal length of the first lens;
f3: a focal length of the third lens;
R5: a curvature radius of an object side surface of the third lens; and R6: a curvature radius of an image side surface of the third lens.

2. The camera optical lens according to claim 1 further satisfying the following conditions:

$$2.00 \leq f1/f3 \leq 4.65; \text{ and}$$

$$-15.00 \leq R5/R6 \leq -10.00.$$

3. The camera optical lens according to claim 1, wherein, the first lens has a positive refractive power with a convex object side surface in a paraxial region and a concave image side surface in the paraxial region; the camera optical lens further satisfies the following conditions:

$$1.03 \leq f1/f \leq 5.59;$$

$$-19.60 \leq (R1+R2)/(R1-R2) \leq -2.79; \text{ and}$$

$$0.06 \leq d1/TTL \leq 0.31;$$

where f: a focal length of the camera optical lens;
R1: a curvature radius of the object side surface of the first lens;
R2: a curvature radius of the image side surface of the first lens;
d1: an on-axis thickness the first lens; and
TTL: a total optical length from the object side surface of the first lens of the camera optical lens to an image surface of the camera optical lens along an optical axis.

4. The camera optical lens according to claim 3 further satisfying the following conditions:

$$1.64 \leq f1/f \leq 4.47;$$

$$-12.25 \leq (R1+R2)/(R1-R2) \leq -3.49; \text{ and}$$

$$0.10 \leq d1/TTL \leq 0.25.$$

5. The camera optical lens according to claim 1, wherein, the second lens has a convex object side surface in a paraxial region and a concave image side surface in the paraxial region; the camera optical lens satisfies the following conditions:

$$-89.44 \leq f2/f \leq -26.34;$$

$$11.95 \leq (R3+R4)/(R3-R4) \leq 36.11; \text{ and}$$

$$0.02 \leq d3/TTL \leq 0.07;$$

where f: a focal length of the camera optical lens;
f2: a focal length of the second lens;
R3: a curvature radius of the object side surface of the second lens;
R4: a curvature radius of the image side surface of the second lens;
d3: an on-axis thickness of the second lens; and
TTL: a total optical length from an object side surface of the first lens of the camera optical lens to an image surface of the camera optical lens along an optical axis.

6. The camera optical lens according to claim 5 further satisfying the following conditions:

$$-55.90 \leq f2/f \leq -32.93;$$

$$19.12 \leq (R3+R4)/(R3-R4) \leq 28.89; \text{ and}$$

$$0.03 \leq d3/TTL \leq 0.06.$$

7. The camera optical lens according to claim 1, wherein, the object side surface of the third lens being convex in a paraxial region and the image side surface of the third lens being convex in the paraxial region; and the camera optical lens satisfies the following conditions:

$$0.43 \leq f3/f \leq 1.54;$$

$$0.41 \leq (R5+R6)/(R5-R6) \leq 1.30; \text{ and}$$

$$0.04 \leq d5/TTL \leq 0.16;$$

where f: a focal length of the camera optical lens;
d5: an on-axis thickness of the third lens; and
TTL: a total optical length from an object side surface of the first lens of the camera optical lens to an image surface of the camera optical lens along an optical axis.

8. The camera optical lens according to claim 7 further satisfying the following conditions:

$$0.69 \leq f3/f \leq 1.23;$$

$$0.65 \leq (R5+R6)/(R5-R6) \leq 1.04; \text{ and}$$

$$0.07 \leq d5/TTL \leq 0.13.$$

9. The camera optical lens according to claim 1, wherein, the fourth lens has a negative refractive power with a convex object side surface in a paraxial region and a concave image side surface in the paraxial region; the camera optical lens further satisfies the following conditions:

$$-2.93 \leq f4/f \leq -0.86;$$

$$1.25 \leq (R7+R8)/(R7-R8) \leq 4.15; \text{ and}$$

$$0.02 \leq d7/TTL \leq 0.08;$$

where f: a focal length of the camera optical lens;
f4: a focal length of the fourth lens;
R7: a curvature radius of the object side surface of the fourth lens;
R8: a curvature radius of the image side surface of the fourth lens;
d7: an on-axis thickness of the fourth lens; and
TTL: a total optical length from an object side surface of the first lens of the camera optical lens to an image surface of the camera optical lens along an optical axis.

10. The camera optical lens according to claim 9 further satisfying the following conditions:

$$-1.83 \leq f4/f \leq -1.08;$$

$$2.00 \leq (R7+R8)/(R7-R8) \leq 3.32; \text{ and}$$

$$0.03 \leq d7/TTL \leq 0.06.$$

11. The camera optical lens according to claim 1, wherein, the fifth lens has a positive refractive power with a convex object side surface in a paraxial region and a convex image side surface in the paraxial region; the camera optical lens further satisfies the following conditions:

$$0.36 \leq f5/f \leq 1.36;$$

$$0.22 \leq (R9+R10)/(R9-R10) \leq 1.07; \text{ and}$$

$$0.09 \leq d9/TTL \leq 0.28;$$

where f: a focal length of the camera optical lens;
f5: a focal length of the fifth lens;
R9: a curvature radius of the object side surface of the fifth lens;

R10: a curvature radius of the image side surface of the fifth lens;
d9: an on-axis thickness of the fifth lens; and
TTL: a total optical length from an object side lens of the camera optical lens to an image surface of the camera optical lens along an optical axis.

12. The camera optical lens according to claim 11 further satisfying the following conditions:

$0.58 \leq f5/f \leq 1.08;$ $0.35 \leq (R9+R10)/(R9-R10) \leq 0.86;$ and $0.14 \leq d9/TTL \leq 0.22.$ 13. The camera optical lens according to claim 1, wherein, the sixth lens has a negative refractive power with a concave object side surface in a paraxial region and a concave image side surface in the paraxial region; the camera optical lens further satisfies the following conditions:

$-1.66 \leq f6/f \leq -0.43;$ $0.04 \leq (R11+R12)/(R11-R12) \leq 1.06;$ and $0.04 \leq d11/TTL \leq 0.15;$ where
f: a focal length of the camera optical lens;
f6: a focal length of the sixth lens;
R11: a curvature radius of the object side surface of the sixth lens;
R12: a curvature radius of the image side surface of the sixth lens;
d11: an on-axis thickness of the sixth lens; and
TTL: a total optical length from an object side surface of the first lens of the camera optical lens to an image surface of the camera optical lens along an optical axis.

14. The camera optical lens according to claim 13 further satisfying the following conditions:

$-1.04 \leq f6/f \leq -0.54;$ $0.07 \leq (R11+R12)/(R11-R12) \leq 0.85;$ and $0.07 \leq d11/TTL \leq 0.12.$ 15. The camera optical lens according to claim 1, wherein, a combined focal length of the first lens and the second lens is f12; a focal length of the optical camera lens is f; and the camera optical lens further satisfies the following conditions:

$1.05 \leq f12/f \leq 6.03.$

16. The camera optical lens according to claim 15 further satisfying the following conditions:

$1.69 \leq f12/f \leq 4.83.$

17. The camera optical lens as described in claim 1, wherein a total optical length TTL from an object side surface of the first lens of the camera optical lens to an image surface of the camera optical lens along an optical axis is less than or equal to 7.96 millimeters.

18. The camera optical lens as described in claim 17, wherein the total optical length TTL from the object side surface of the first lens of the camera optical lens to the image surface of the camera optical lens along the optical axis is less than or equal to 7.59 millimeters.

19. The camera optical lens as described in claim 1, wherein an F number of the camera optical lens is less than or equal to 1.81.

20. The camera optical lens as described in claim 19, wherein the F number of the camera optical lens is less than or equal to 1.78.

* * * * *